(12) United States Patent
Kumar KN et al.

(10) Patent No.: US 11,775,410 B2
(45) Date of Patent: Oct. 3, 2023

(54) DATABASE OBSERVATION SYSTEM

(71) Applicant: CERNER INNOVATION, INC., Kansas City, KS (US)

(72) Inventors: Naveen Kumar KN, Bangalore (IN); Shamseer KK, Kerala (IN); Rohit Kumar, Bihar (IN); Pratyush Panigrahy, Odisha (IN); Eric Gold, Leawood, KS (US); Shalini Gupta, Bangalore (IN); Thomas LeBlanc, Linwood, KS (US)

(73) Assignee: Cerner Innovation, Inc., Kansas City, MO (US)

( * ) Notice: Subject to any disclaimer, the term of this patent is extended or adjusted under 35 U.S.C. 154(b) by 0 days.

(21) Appl. No.: 17/242,912

(22) Filed: Apr. 28, 2021

(65) Prior Publication Data
US 2022/0350724 A1      Nov. 3, 2022

(51) Int. Cl.
*G06F 11/34*       (2006.01)
*G06F 16/23*       (2019.01)
*G06F 16/21*       (2019.01)
*G06F 11/32*       (2006.01)

(52) U.S. Cl.
CPC ........ *G06F 11/3423* (2013.01); *G06F 11/328* (2013.01); *G06F 16/21* (2019.01); *G06F 16/2358* (2019.01)

(58) Field of Classification Search
CPC .. G06F 11/3423; G06F 16/21; G06F 16/2358; G06F 11/328
See application file for complete search history.

(56) References Cited

U.S. PATENT DOCUMENTS

| | | | |
|---|---|---|---|
| 10,776,241 B1* | 9/2020 | Christensen | G06N 20/00 |
| 2017/0004433 A1* | 1/2017 | Raghavan | G06Q 10/06393 |
| 2021/0037035 A1* | 2/2021 | Graul | H04L 63/1425 |
| 2021/0064199 A1* | 3/2021 | Castillo | G06F 16/9038 |
| 2021/0342193 A1* | 11/2021 | Anand | G06F 11/3447 |

* cited by examiner

*Primary Examiner* — Tamara T Kyle
*Assistant Examiner* — Lahcen Ennaji
(74) *Attorney, Agent, or Firm* — Invoke

(57) ABSTRACT

Systems, methods, and storage media are provided that are useful in a computing environment for receiving, modifying, and transforming service level information from database servers and entities in a hosted database environment. Multiple application programming interface (API) calls are made by a database observation system to request information for multiple service level indicators from database servers belonging to multiple different entities. Database observation system receives and aggregates the information for multiple service level indicators from each of the database servers belonging to multiple different entities. The database observation system provides, within a dashboard interface, the aggregated information for each of the multiple service level indicators, individual service level indicator scores, and aggregated service level indicator scores for each of the database servers for each of the multiple entities.

17 Claims, 9 Drawing Sheets

DATABASE OBSERVATION SYSTEM

BACKGROUND

The growing complexity of computing environments with database servers in many locations and with many users frequently hinders the understanding of database server behavior. Database servers hosted by the same platform may be in thousands of locations, with thousands of users and located in all time zones.

Because of the nature of monitoring thousands of database servers in disparate locations, it is difficult to monitor the overall health of all of the database servers. Moreover, there may be multiple types of database servers creating bottlenecks in a service workflow. In many cases, this causes delays in both proactive and reactive engagement to maintain the health of the database servers. In addition, due to the distributed nature of database servers, database engineers are unable to efficiently and effectively identify and resolve vulnerabilities and compliance issues before issues arise.

SUMMARY

This Summary is provided to introduce a selection of concepts in a simplified form that are further described below in the Detailed Description. This Summary is not intended to identify key features nor essential features of the claimed subject matter, nor is it intended to be used as an aid in determining the scope of the claimed subject matter. The present disclosure is defined by the claims as supported by the Specification, including the Detailed Description.

Systems, methods, and storage media provided that are useful in a computing environment for receiving, modifying and transforming service level information from database servers and entities in a hosted database environment. Multiple application programming interface (API) calls are made by a database observation system to request information for multiple service level indicators from database servers belonging to multiple different entities. A database observation system receives and aggregates the information for multiple service level indicators from each of the database servers belonging to multiple different entities. The database observation system provides, within a dashboard interface, the aggregated information for each of the multiple service level indicators for each of the database servers for each of the multiple entities.

The multiple service level indicators observed can include database backups, uptime production improvements, downtime and rolling production improvements, database storage, Block Change Tracking (BCT) Score, Assurance Status Monitoring (ASM) monitoring score, unused disk storage score, critical open incidents, incident free time (IFT), uptime, application hangs, average active sessions, and non-critical open incidents. The database observation system determines, utilizing a computer processor, a service level indicator score for each of the multiple service level indicators for a database server. The database observation system further determines, utilizing a computer processor, an aggregated service level indicator score for a database server by applying a weighted formula to the multiple service level indicator scores. Database observation system provides the aggregated service level indicator score within a dashboard interface. Database observation system, utilizing a computer processor, calculates an aggregated service level indicator score for an entity by averaging the aggregated service level indicator score for each of the database servers of the entity. The aggregated service level indicator score for an entity is provided within a dashboard interface. Database observation system also calculates individual service level indicator scores for the environment by averaging individual service level indicator scores for all entities hosted by the environment. Database observation system also calculates an aggregated service level indicator score for the environment by averaging the aggregated service level indicator scores for all entities hosted by the environment.

BRIEF DESCRIPTION OF THE DRAWINGS

Illustrative aspects of the present invention are described in detail below with reference to the attached drawing figures, and wherein.

DETAILED DESCRIPTION

The subject matter of the present invention is being described with specificity herein to meet statutory requirements. However, the description itself is not intended to limit the scope of this patent. Rather, the inventors have contemplated that the claimed subject matter might also be embodied in other ways, to include different operators or combinations of operators similar to the ones described in this document, in conjunction with other present or future technologies. Terms should not be interpreted as implying any particular order among or between various operators herein disclosed unless and except when the order of individual operators is explicitly described. As such, although the terms "operator" and/or "block" can be used herein to connote different elements of system and/or methods, the terms should not be interpreted as implying any particular order and/or dependencies among or between various components and/or operators herein disclosed unless and except when the order of individual operators is explicitly described. The present disclosure will now be described more fully herein with reference to the accompanying drawings, which may not be drawn to scale and which are not to be construed as limiting. Indeed, the present invention can be embodied in many different forms and should not be construed as limited to the aspects set forth herein. Further, it will be apparent from this Detailed Description that the technological solutions disclosed herein are only a portion of those provided by the present invention. As such, the technological problems, solutions, advances, and improvements expressly referenced and explained herein should not be construed in a way that would limit the benefits, improvements, and/or practical application of the discussed aspects of the present invention.

Figure 1:
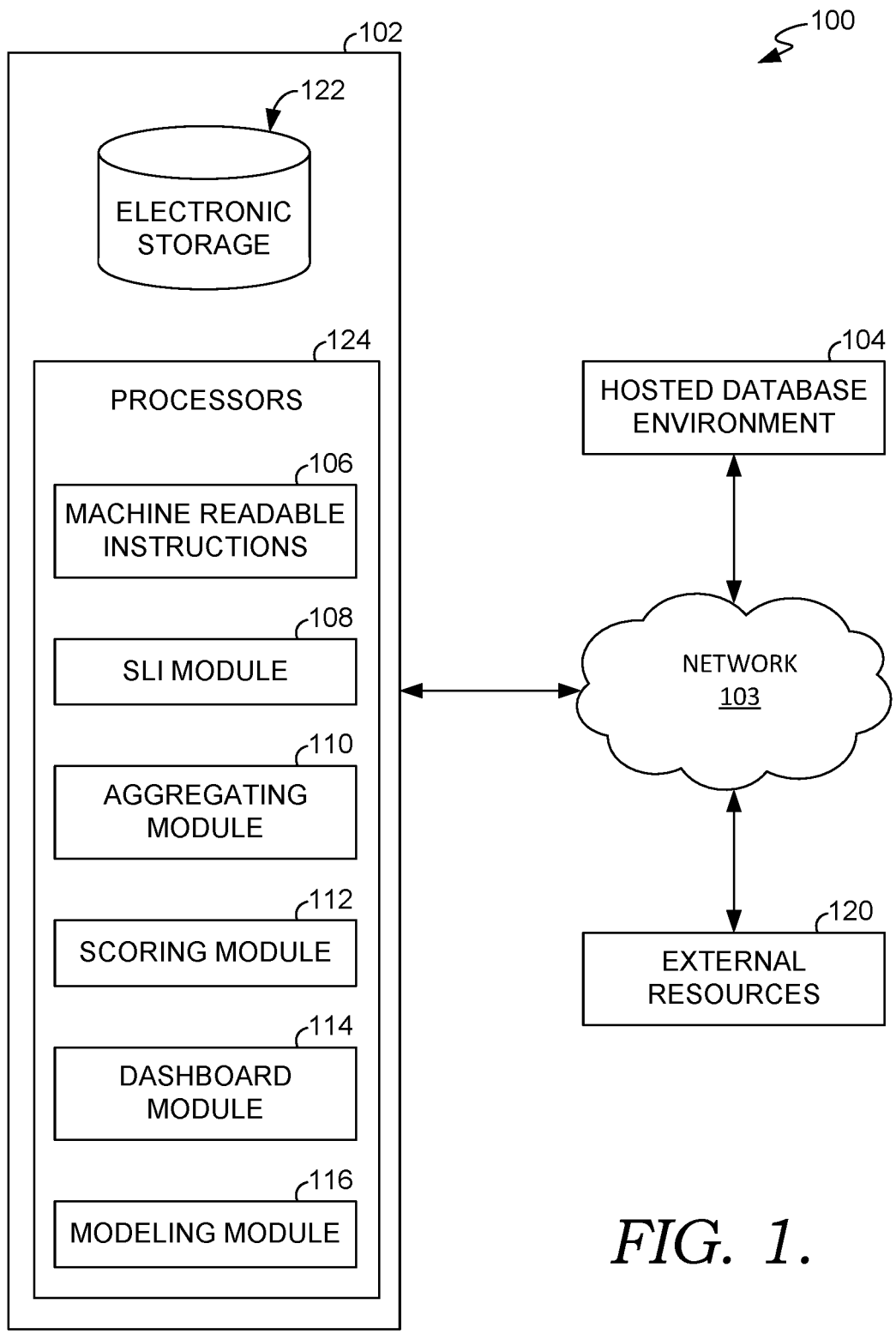
FIG. 1 illustrates a database observation computing system, in accordance with aspects of the invention.
Figure 2:
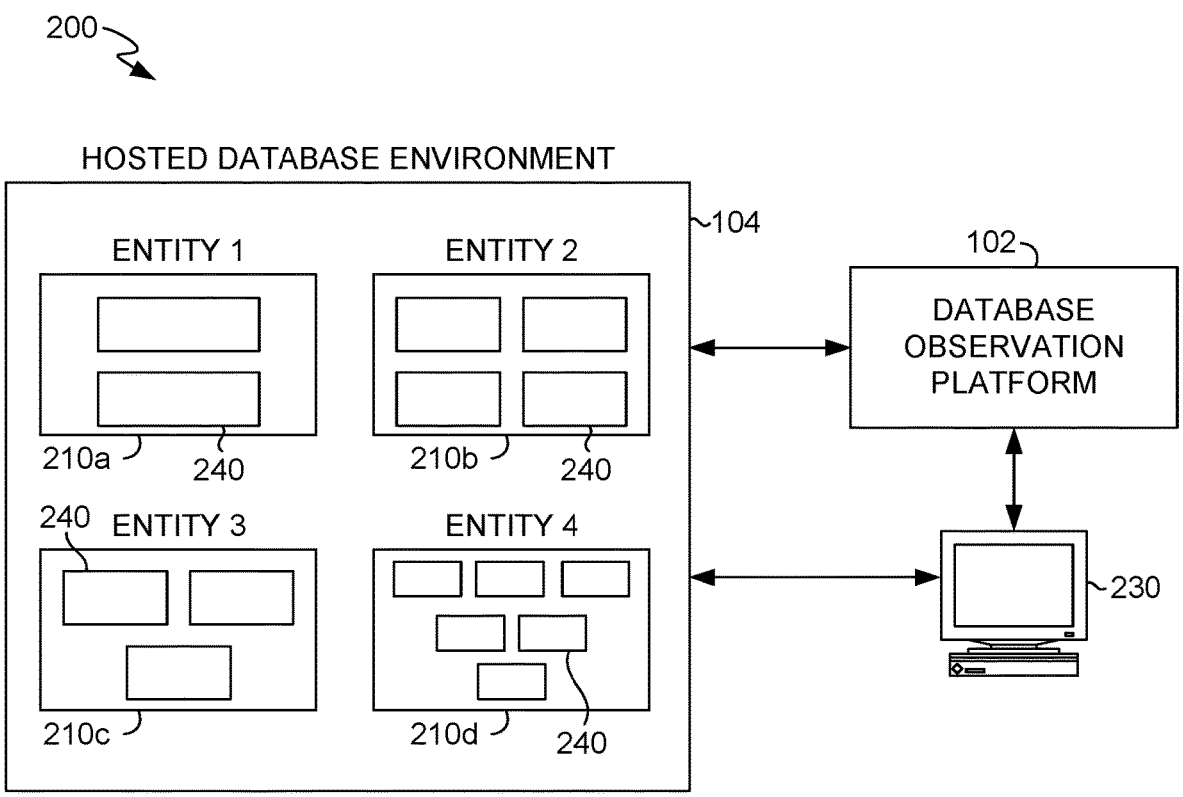
FIG. 2 illustrates hosted database environment and database observation computing system, in accordance with aspects of the invention.

Referring to FIG. 1, database observation system (DOS) 102 is a data-driven effort to establish service level indicators (SLIs) that reflect the health of database servers located throughout the world by monitoring, tracking, and triaging of abnormalities and triggering an action. SLIs are a measurement for various reliability segments of any database server, such as performance, availability, storage, backups, capacity planning, and incident tickets. The purpose of the DOS 102 is to define an overall health score of individual database servers and the overall hosted database environment 104. With reference to FIG. 2 and environment 200, various key service level indicators are collected from database servers 240 and used to calculate service level scores for individual database servers 240, a group of database servers 240 for one or more entities 210*a-d*, and the hosted database environment 104. This provides users and administrators 230 of the hosted database environment 104 direction and focus for a plan needed for improving and maintaining health and efficiency of individual database servers 240, entities 210, and the overall hosted database environment 104.

Components of the environment 200 may communicate with each other over one or more networks (e.g., public network or virtual private network) as shown with network 103. The network 103 may include, without limitation, one or more local area networks and/or wide area networks. Further, network 103 may include a personal area network or the Internet, by way of example. In some embodiments, network 103 may be an ad hoc network, an intranet, an extranet, a metropolitan area network, a portion of the Internet, a portion of a public switched telephone network, a Wi-Fi network, another type of network, or a combination of two or more such networks.

In one embodiment, database observation system 102 monitors a hosted database environment 104. Such a hosted database environment 104 may include thousands of database servers 240, multiple node wide real application clusters, hundreds of thousands of users, enormous amounts of petabytes of data and multiple data centers located across the world. The hosted database environment may be hosted by a service platform, such as CERNER MILLENNIUM®. In a hosted database environment 104, database servers 240 are deployed and located with hundreds, if not thousands, of entities 210*a-d* (such as clients) hosted by a service platform. Each of entities 210*a-d* is separate from other entities 210*a-d* physically and digitally. In embodiments, the hosted database environment 104, including deployed database servers, are monitored and maintained by the service platform host utilizing the database observation system 102 described herein. Database engineers and administrators 230 for the hosted database environment 104 are located across the world and help maintain the health of the hosted database environment 104 and deployed database servers 240 across hundreds of entities 210.

In one embodiment, the hosted database environment 104 includes 2,500 database servers 240, about or approximately seven node-wide real application clusters, 850,000 concurrent users, 40 petabytes of data, 375+ hosted entities 240, and 11 data centers located across the world. Currently, there is no integrated system to monitor service level indicators from a hosted database environment 104 of this size. Further, database engineers and administrators 230 of the hosted database environment 104 do not have visibility of the overall environment and individual database servers 240 in a single solution. Furthermore, without a single global view, capacity planning for the overall hosted database environment 104 is difficult. Furthermore, no solution provides abnormality detection and capacity and backup action plans described by the database observation system 102 of embodiments of the invention.

Accordingly, problems in prior database systems and environments include no unified system or method for monitoring performance and service quality of the database system or environment. Specifically, these problems include a lack of service level indicators for a database stack, a lack of monitors to how each service level indicator is performing, no baseline for each service level indicator, unavailability of centralized platform measurement comprising an overall health score of database, no baseline for the overall health score, no means for defining service level objectives, no means for detecting abnormalities of the database, and no action plans for the detected abnormalities. As such, the embodiments herein provide technological improvements over other systems as the embodiments create new functionalities for generating and assigning service level indicators in a database stack that are used to monitor performance.

To remedy these problems, embodiments of the present invention define SLIs for database stack, data collection, and quantitative measurement. Embodiments of the present invention are directed to a centralized database observation system 102 for collecting and aggregating information for SLIs from all database servers 240 in the hosted database environment 104. The database observation system 102 utilizes the information for SLIs for all of the database servers 240 in the hosted database environment 104 to determine overall health for individual database servers 230 and database servers for each entity 210. The database observation system 102 allows database server engineers and administrators 230 to define baseline service level objectives (SLOs), including SLO goals for individual database servers 240, database servers for each entity 210, and SLO goals for the hosted database environment 104. Additionally, the database observation system 102 allows abnormalities in database servers 240 to be quickly identified and notification is sent to database engineers providing an alert and prioritized action plan.

The database observation system 102 of embodiments of the invention assists a hosted database environment 104 to monitor information for defined service level indicators (SLIs) and can be utilized by the hosted database environment 104 and track SLIs for individual database servers 240 and database servers belonging to particular entities 210.

FIG. 1 illustrates a system configured to be useful in a computer system 100 for monitoring service level indicators, in accordance with one or more implementations. In some implementations, system may include database observation system 102. Computing database observation system(s) 102 may be configured to communicate with one or more service platforms hosted by hosted database environment 104 according to a client/server architecture, a peer-to-peer architecture, and/or other architectures. Users may access system 100 via hosted database environment 104. For example, database servers 240 hosted by hosted database environment 104 are located at entities 210*a-d* with multiple users.

Database observation system(s) 102 may be configured by machine-readable instructions 106. Machine-readable instructions 106 may include one or more instruction modules. The instruction modules may include computer program modules. The instruction modules may include one or more of SLI module 108, aggregating module 110, scoring module 112, dashboard 114, modeling module 116, and/or other instruction modules.

SLI module 108 is in communication with database servers 240. For example, hosted database environment 104 hosts database servers 240. It will be appreciated that SLI module 108 is in communication with thousands of database servers. Database servers may be a variety of database server types including ORACLE®, MICROSOFT® SQL, MySQL®, IBM®, SAP® servers and other relational database servers. Database servers 240 include or have access to infrastructure that is capable of receiving and communicating information for use by, for example, the SLI module 108 of database observation system 102. The information received and communicated in association with servers 240 comprises information associated with SLIs that can be utilized by aggregating module 110, scoring module 112, dashboard module 114, and modeling module 116.

SLI module 108 installs applications on database servers 240 to monitor and track SLI information for each database server 240. The application installed may include applications for tracking and collecting SLIs related to individual database server 240 performance.

API requests are made by SLI module 108 to database servers 240, in real-time, to collect information for the SLIs from the applications installed on the database servers 240. It will be appreciated that the API calls may be made on a scheduled basis, as frequently as every minute, daily, or weekly or may be in response to a user, such as a database engineer 230, request. For example, a data engineer or administrator 230 for the environment 104 may make a selection to cause an API call to request, in real-time, the information for one or more database servers 240 from one or more proprietary applications.

API calls are made for multiple service level indicators and define the information collected from various data sources. Based on the nature of SLI, the information collection happens in real time and on scheduled intervals. For example, SLI information for application hangs and average active sessions (AAS) data collection happens in real time (or near real time); archive backup execution happens every 15 minutes on the database and production improvement status checks are executed daily.

The SLI module 108 defines the SLIs and information to be collected for the SLIs. SLIs can include database backups, uptime production improvements, downtime and rolling production improvements, database storage, BCT Score, ASM monitoring score, unused disk storage score, critical open incidents, incident free time (IFT), uptime, application hangs, average active sessions, and non-critical open incidents. It will be appreciated that database observation system may add or remove SLIs as needed to maintain flexibility to the environment.

It will be appreciated that scoring module 112 may apply weights to SLIs to determine the overall health of a database server, group of servers, or system environment. It will be appreciated that although database observation system applies weights to SLIs, the weighting of SLIs and calculation of overall health score may change to maintain flexibility within the environment.

Archive Backup Score

Service level indicator for archive backup is based on the successful backup of the database server based on the target timing. For example, API call requests are made by SLI module 108 to each of database servers 240 every 15 minutes to determine whether or not the archive backup was completed for each of the individual database servers 240 or database servers for an entity 210. If the archive backup is completed within the target time, the overall health score would receive a weighted score (e.g., weighted score of "24" discussed hereinafter) reflecting that the archive backup completed within the target time.

As archive backup is an important measurement of database server 240 health and the health of the environment, this has a high weight and is an important component of the overall health score.

Production Improvements (Uptime & Downtime/Rolling)

Service level indicator for production improvements (PI) contains the audit results of PIs across database servers 240. The audit comprises scripts that run to check the implementation/compliance status of each database server. Production improvements are two categories, which are uptime production improvement score and downtime/rolling production improvement score. In one embodiment, the PI scores are obtained from the database server manufacturer, such as ORACLE®.

The uptime production improvement score is calculated by the number of times uptime production improvements passed, divided by the total number of uptime production improvements (i.e., % uptime PIs passing for an entity domain). For example, if 2 out of 100 uptime production improvements are failing for a database server, the uptime production improvement score is 98%. The downtime/rolling production improvement score is calculated by the number of downtime and rolling production improvements passed, divided by the total number of downtime/rolling production improvements (i.e., downtime/rolling production improvements passing for a database server). For example if 2 of 100 downtime/rolling production improvements are failing for a database server, the downtime/rolling production improvements score is 98%.

Database Storage Score

Service level indicator for database storage score is based on the storage statistics for a database server. The database storage score, for each database server, is based on monthly growth (in GB) and months remaining (based on current storage allocation). The database storage score is calculated at the database level on a scale of [0-100] % based on the below criteria:

| Months Remaining (MR) | Database Storage Score |
|---|---|
| MR <= 2.5 | 0% |
| 2.5 < MR <= 3 | 50% |
| 3 < MR <= 12 | 100% |
| 12 < MR <= 13 | 85% |
| 13 < MR <= 14 | 70% |
| 14 < MR <= 15 | 55% |
| 15 < MR <= 16 | 40% |
| 16 < MR <= 17 | 25% |
| 17 < MR <= 18 | 10% |
| 18 < MR | 5% |
| Monthly Growth <=20 & MR >12 and Free Space <=500 GB | 100% (Exceptional Ranking) |

Block Change Tracking (BCT) Score

SLIs comprise one or more BCT Scores. In addition to the BCT score, there may be a BCT weight and a BCT remaining impact of the overall impact SLI impact score. The BCT score may be graphed along an SLI trend of the SLIs that are available. The SLI trend may include the values of the BCT graphed against the rundate.

Assurance Status Monitoring (ASM) Score

The service level indicator for an ASM score on the database stack is based on a total node count. For example, the ASM score is based on data received from the database server corresponding to a node count when database agents are unreachable ("Agents Down"), a node count when database agents up and not unreachable but targets are unreachable ("AgentsUp-TargetsDown"), and a node count when ASM targets are not configured or are misconfigured ("ASM Target Down"). The ASM monitoring score may be calculated by averaging the following: a percentage of (Agents Down/Total Node Count), a percentage of (AgentsUp-TargetsDown/Total Node Count), and a percentage of (ASM Target Down/Total Node Count).

Unused Disk Storage

The service level indicator for unused disk storage is based on data received from the database server with the amount of GB which is free over 45 days. The unused disk storage score is calculated based on how many days since any array has free storage and follows the below-scoring grid. For example, if a database server has four arrays having free storage since day 50, 30, 25, 1 respectively, the database server will be considered to have free storage since 50 (the oldest) days and will be given 0 scores as per the below grid. Another example is if a database server has three arrays having free storage since 26, 25 and 2 days respectively, then the database server will be considered to have free storage since 26 days (the oldest) and will be given 95% of unused disk storage score.

| Days as Free Storage (Max of any array) | Unused Disk Storage Score (%) |
|---|---|
| <=25 | 100 |
| 26 | 95 |
| 27 | 90 |
| 28 | 85 |
| 29 | 80 |
| 30 | 75 |
| 31 | 70 |
| 32 | 65 |
| 33 | 60 |
| 34 | 55 |
| 35 | 50 |
| 36 | 45 |
| 37 | 40 |
| 38 | 35 |
| 39 | 30 |
| 40 | 25 |
| 41 | 20 |
| 42 | 15 |
| 43 | 10 |
| 5 | 5 |
| >=45 | 0 |

Critical Open Incident Score

This SLI contains the details on critical open incidents. It will be appreciated that data for critical open incidents may be obtained by an application of the database observation system residing on database servers or may be obtained from database server manufacturer software. Critical open incident score is calculated based on the average turn-around time (in hours) for all the critical open incidents as per the below grid:

| Average TAT in Hours | Critical Open INC Score % |
|---|---|
| <=3 | 100 |
| <=6 | 90 |
| <=9 | 80 |
| <=12 | 70 |
| <=15 | 60 |
| <=18 | 50 |
| <=21 | 40 |
| <=24 | 30 |
| >24 | 0 |

Incident Free Time (IFT)

This SLI is calculated based on the amount of time when the database server is incident free, for a time period defined in the service level agreement (SLA) between the entity and the hosted database environment.

Uptime Time

This SLI is calculated based on whether the database server is uptime for the period defined in the service level agreement (SLA) between the entity and the hosted database environment.

Application Hangs

Application hangs generally refer to a scenario where a database transaction is experiencing five or more second of delay in response time, such that a related application is "hung." This SLI calculates the number of application hangs in relation to total transactions for a database server. The application hang score is calculated based on number of application hangs to the number of total transactions. For example, APPHANG_PERC=(APPHANG_COUNT/TOTAL_COUNT)*100 and follows the below grid:

| App Hang Percentage % | App Hang Score % |
|---|---|
| <=0.1 | 100 |
| <=0.2 | 99 |
| <=0.3 | 98 |
| <=0.4 | 97 |
| <=0.5 | 96 |
| <=0.6 | 95 |
| <=0.7 | 94 |
| <=0.8 | 93 |
| <=0.9 | 92 |
| <=1 | 91 |
| <=2 | 90 |
| <=3 | 80 |
| <=4 | 70 |
| <=5 | 60 |
| <=6 | 50 |
| <=7 | 40 |
| <=8 | 30 |
| <=9 | 20 |
| <=10 | 10 |
| >10 | 0 |

Average Active Sessions

This SLI uses the statistics on average active session (AAS) to calculate the average active session deviation % based on the last 30 days average active sessions values. In order to calculate the AAS score, the AAS deviation from the last 30 days average AAS is calculated. The AAS score is then calculated based on the value of AAS Deviation % as per the below scoring table:

AAS Deviation %=AAS/Average AAS from last 30 days

| Average Active Session Deviation % | Average Active Session Score |
|---|---|
| <=50 | 100 |
| 50-100 | 90 |
| 100-150 | 80 |
| 150-200 | 70 |
| 200-250 | 60 |
| 250-300 | 50 |
| 300-350 | 40 |
| 350-400 | 30 |
| 400-450 | 20 |
| 450-500 | 10 |
| >500 | 0 |

Non-Critical Open Incident Score

This SLI utilizes the details on non-critical open incidents for an entity. It will be appreciated that data for non-critical open incidents may be obtained by an application of the database observation system residing on database servers or may be obtained from database server manufacturer software.

The non-critical open incidents score is calculated based on the average turnaround time (TAT) (in Days) for all the non-critical open incidents as per the below grid:

| Average TAT in Days | Non-Critical Open INC Score % |
|---|---|
| <=1 | 100 |
| <=2 | 90 |
| <=3 | 80 |
| <=4 | 70 |
| <=5 | 60 |
| >5 | 0 |

API call requests are made by SLI module 108 to database servers 240 in real-time to collect information for the SLIs from the applications installed on the database servers 240. The information for multiple SLIs from each of the data servers belonging to multiple different entities is collected, aggregated, and stored in electronic storage 122 by the aggregating module 110. It will be appreciated that aggregating module 110 may utilize a variety of storage databases to collect, store, and aggregate the SLI information, including a columnar storage database with artificial intelligence (AI) capability.

Overall Database Health and Service Level Indicators and Weights

The below table lists the SLIs and their associated weights. These weights play a key role in computing the overall database health score.

The overall database health score is defined as the weighted average of all SLI scores.

| Service Level Indicator | Weight |
|---|---|
| Archive Backup Score | 24 |
| Uptime CWxPI Score | 16 |
| Database Storage Score | 16 |
| BCT Score | 14 |
| ASM Score | 10 |
| Unused Disk Storage Score | 5 |
| Critical Open Incident Score | 3 |
| Uptime Score | 3 |
| Incident Free Time (IFT) Score | 3 |
| App Hang Score | 3 |
| Average Active Session Score | 3 |
| Non-Critical INC Score | 0 |
| Downtime & Rolling CWxPI Score | 0 |

Overall database health score=((SLI1*W1)+(SLI2*W2)...+(SLIN*WN)/(W1+W2+...+WN))*100, wherein SLIN refers to the score for service level indicator N, and wherein WN refers to a weight associated with the service level indicator N.

It will be appreciated that the weights may be changed based on objectives and future information.

The dashboard module 114 provides an interactive graphical user interface with data visualization for SLI scores and trends for individual database servers and groups of database servers. In one embodiment, dashboard module 114 is configured in TABLEAU® but it will be appreciated that any graphical user interface system may be utilized. Dashboard module 114 provides a health score for the overall database and modeling information from modeling module 116. The dashboard module 114 of database observation system further provides an interactive dashboard that allows administrators to compare performance of individual database server engineers on SLIs for database servers served by a particular engineer. Furthermore, the database observation system provides an overall picture of SLIs for database servers across the database server environment.

Figure 5:
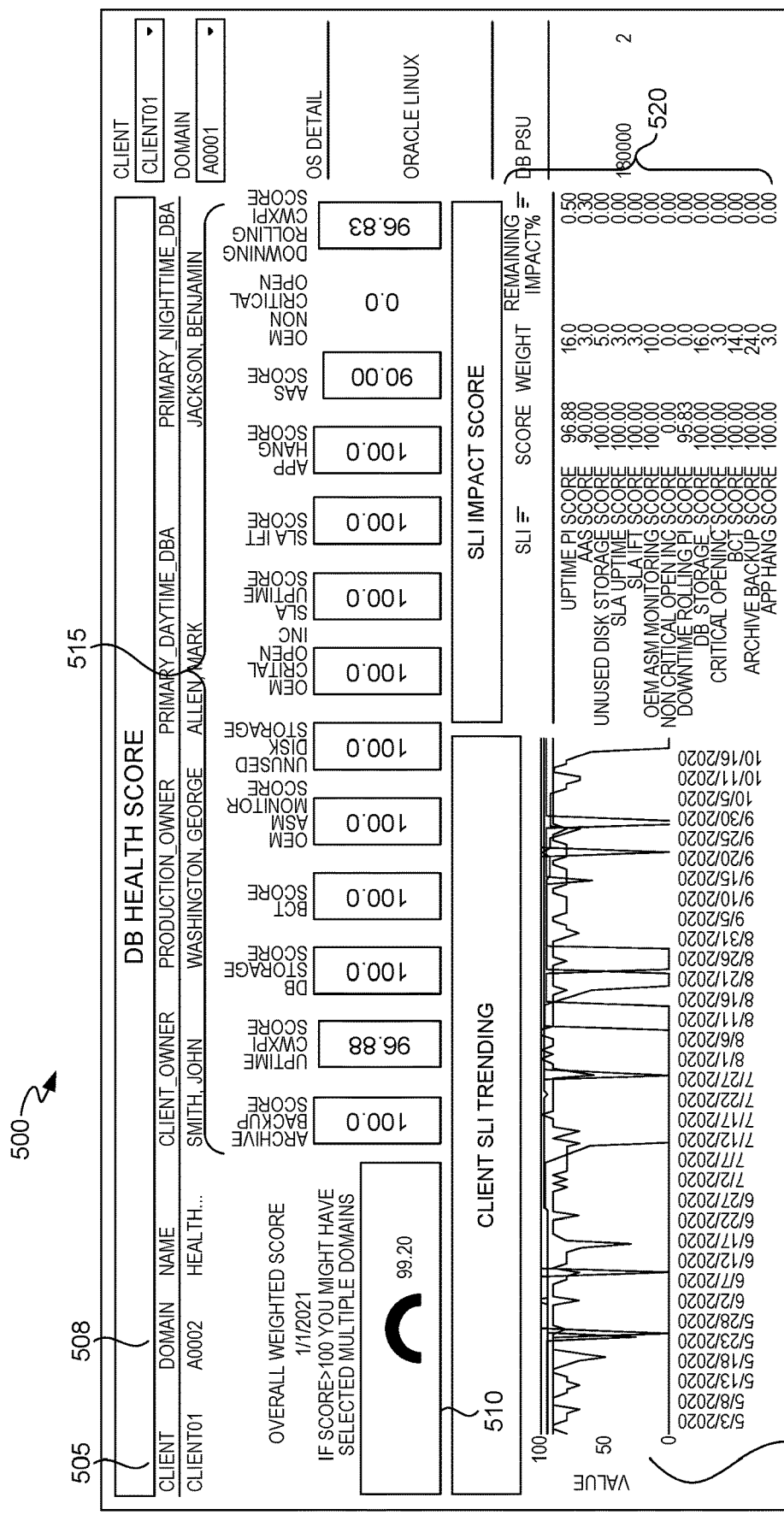
FIGS. 5-10 depict exemplary graphical user interfaces database observation dashboards, in accordance with aspects of the invention.

With reference to FIGS. 5-10, exemplary database observation dashboards are shown. As shown in FIG. 5, dashboard module 114 provides an interactive graphical interface 500 for a database server 508 for entity 505. The interface 500 includes the overall database health score 510 calculated for database server 508. The interface 500 also includes scores for each of the individual SLIs 515. Interface 500 includes the weighting criteria 520 applied to each of the SLI indicators to calculate the overall database health score 510. Interface includes a trend 525 for the overall database health score for the database server 508.

The graphical user interface allows database engineers to determine the stability and configuration of database servers. In addition, to maintain optimal performance database engineers can monitor whether the database server hang time is within the designed range (e.g., hang time of less than 5 seconds less than 1% of the time). Database engineers are able to view whether database servers have been backed up and whether back up days are 100%. Database administrators may utilize the SLI information and scores to optimize storage, perform capacity planning, forecast storage needs, and dispose of or reallocate unused sources.

Figure 6:
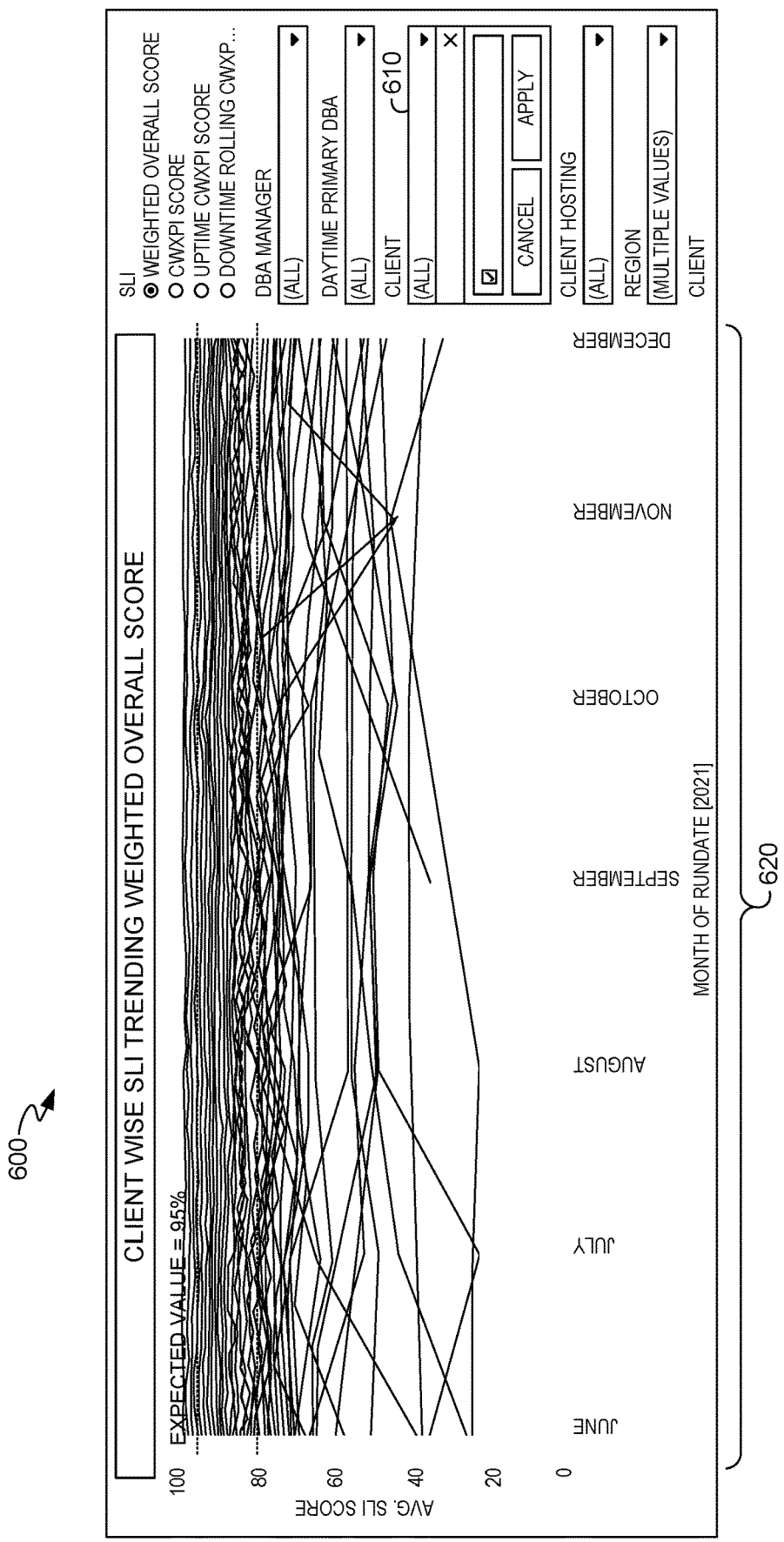

As shown in FIG. 6, dashboard module 114 provides an interactive graphical user interface 600 depicting the aggregated SLI score for all entities 610 for the overall environment. The aggregated SLI scores are shown as a trend 620 of the aggregated SLI scores for all entities 610. This allows an environment administrator to view the overall health of the environment and from the interactive graphical user interface 600. An environment administrator can drill down on particular entities with low/high aggregate SLI scores to find out more information and utilize with modeling module 116 to determine actionable items to improve the health and efficiency of the overall environment.

Figure 7:
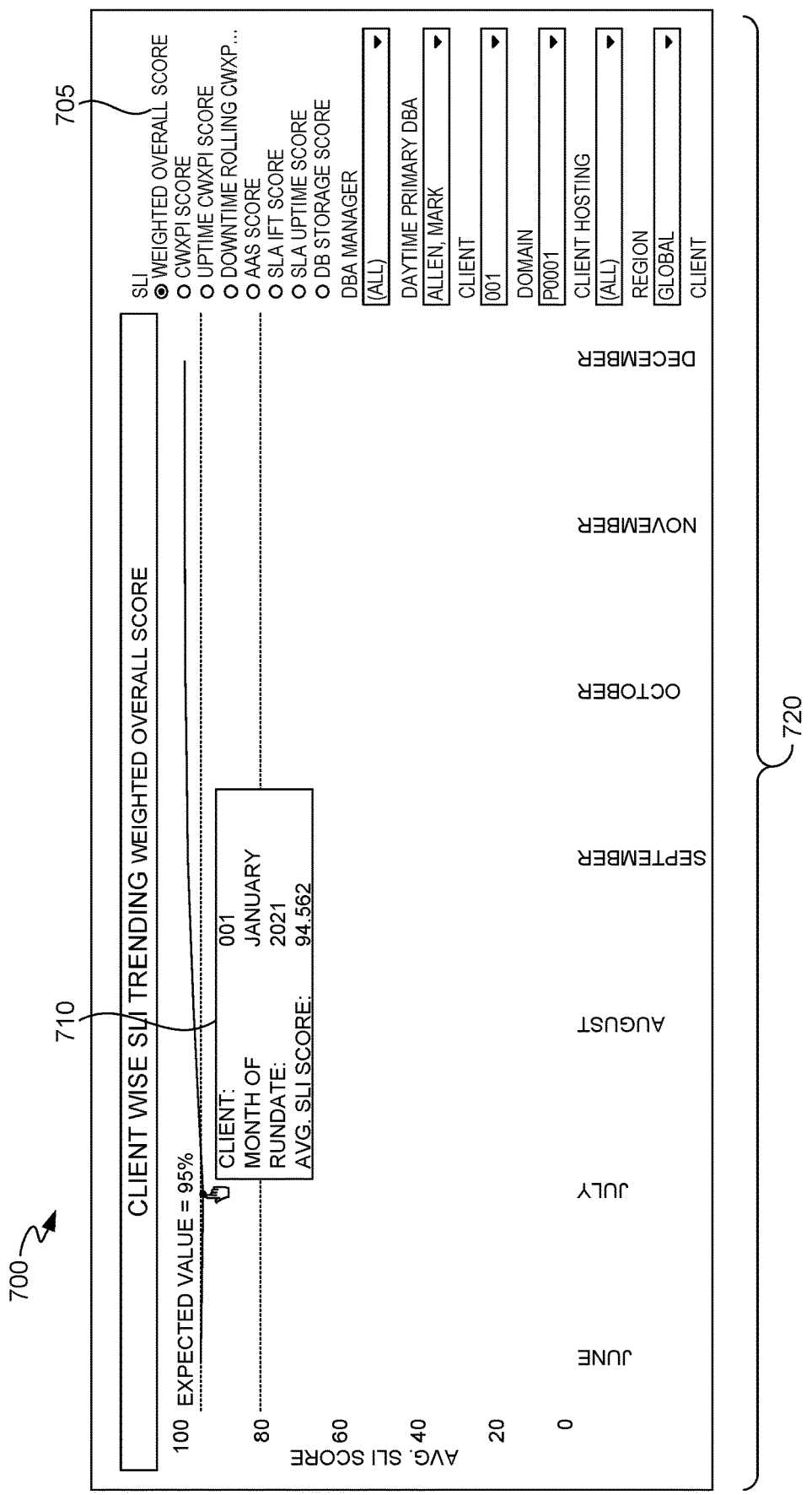

As shown in FIG. 7, dashboard module 114 provides an interactive graphical user interface 700 depicting the aggregated SLI score 705 for particular entity 710. The aggregated SLI score is shown as a trend 720 of the aggregated SLI scores for the entity 710. This allows a database engineer or administrator to view the overall health of the entity from the interactive graphical user interface 700. A database engineer or administrator can drill down on particular database servers of the entity for additional information to find out more information and utilize with modeling module 116 to determine actionable items to improve the health and efficiency of the entity and database servers.

Figure 8:
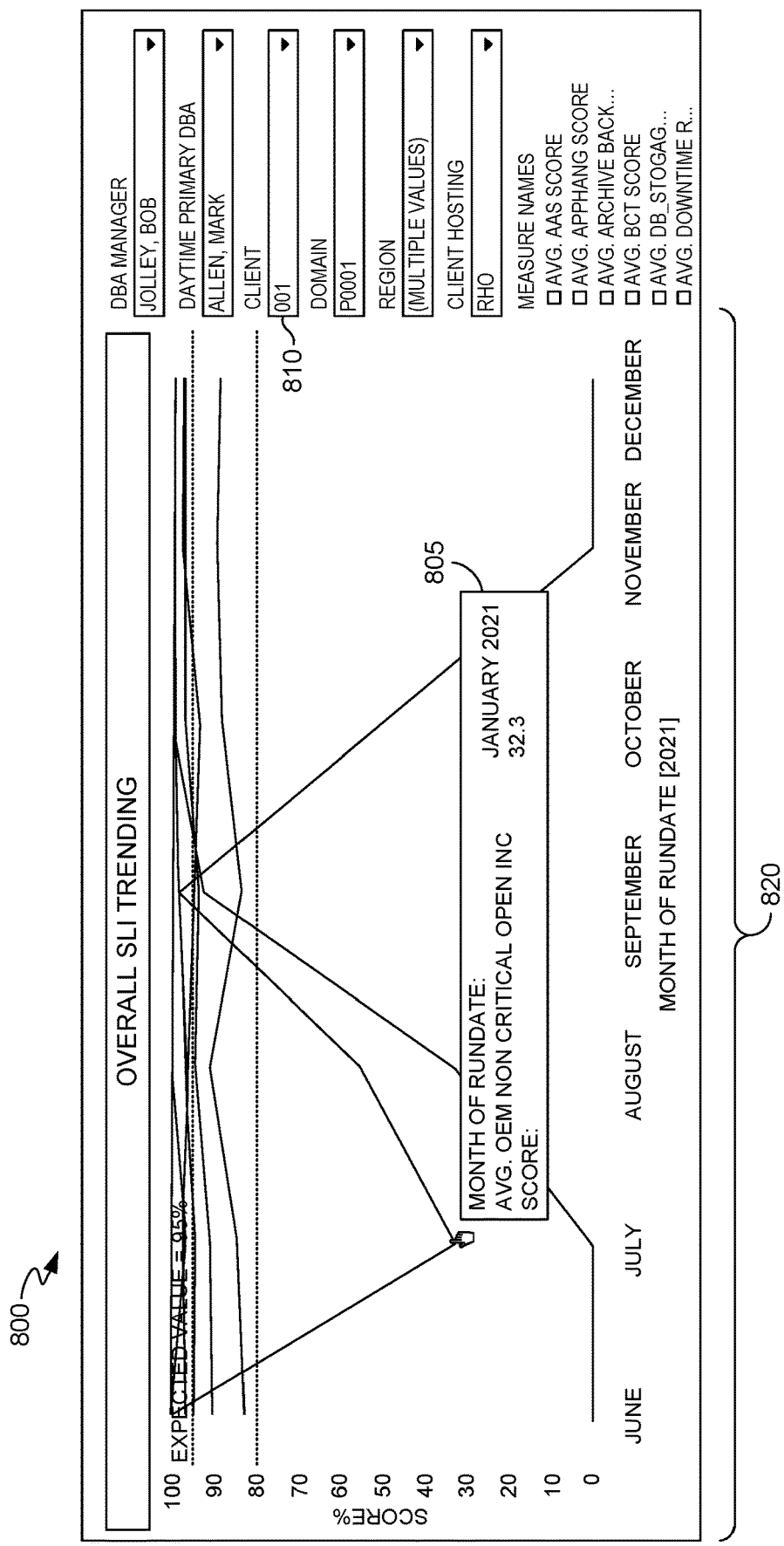

As shown in FIG. 8, dashboard module 114 provides an interactive graphical user interface 800 depicting the individual SLI scores 805 for particular entity 810. The individual SLI scores for an entity 810 are shown as a trend 820. This allows a database engineer to view the individual SLI measurements for the entity from the interactive graphical user interface 800. A database engineer or administrator can drill down on particular SLIs and/or database servers of the entity for additional information to find out more information and utilize with modeling module 116 to determine actionable items to improve the health and efficiency of the entity and database servers.

Figure 9:
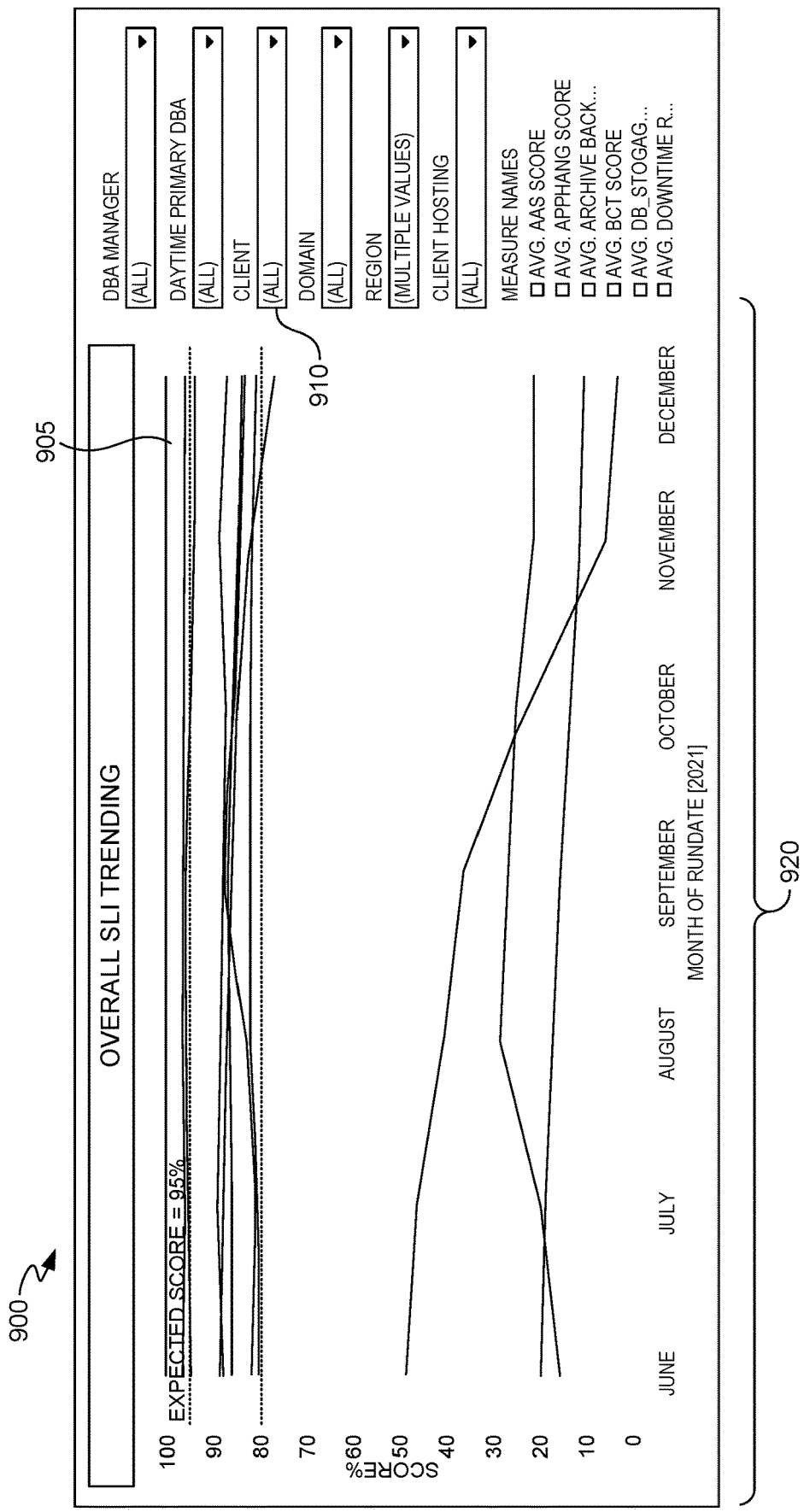

As shown in FIG. 9, dashboard module 114 provides an interactive graphical user interface 900 depicting the individual SLI scores 905 for all entities 910 in an environment. The average individual SLI scores for entities 910 are shown as a trend 920. This allows a database engineer or administrator to view the average individual SLI measurements all entities from the interactive graphical user interface 900. A database engineer or administrator can drill down on particular SLIs for additional information find out more information and utilize with modeling module 116 to determine actionable items to improve the health and efficiency of the environment.

Figure 10:
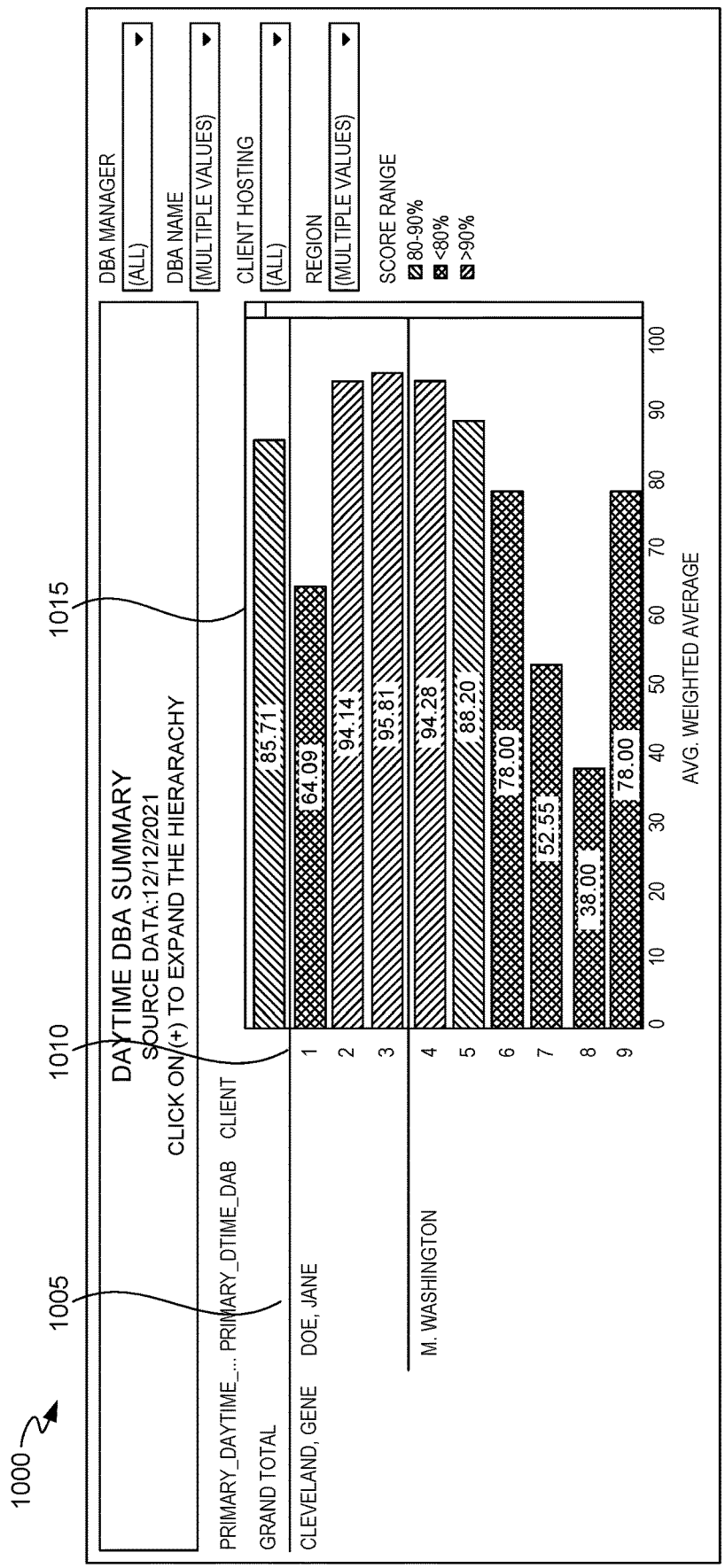

As shown in FIG. 10, dashboard module 114 provides an interactive graphical user interface 1000 depicting average aggregated SLI scores 1015 by database engineer 1005. For example, database engineer 1005 is supporting three clients 1010. The graphical user interface shows the average aggregated SLI scores for the three clients 1010 supported by the database engineer 1005. This allows an environment administrator to effectively see the workload and efficiency of a database engineer 1005. Furthermore, it provides visibility and guidance on how to allocate work to database engineers based on number of clients and average aggregated SLI scores for those clients.

Modeling module 116 allows database engineers and administrators to determine how improvements to certain SLIs would impact performance of database servers, entities, and the overall hosted database environment. From the modeling information, action plans can be created to improve and optimize individual database servers, SLIs to focus on improvements, and database engineer training. The action plans from modeling module 116 can be continually refined to improve service and reliability of the database servers in the environment. For example, modeling module 116 can locate storage that is not being used and reduce storage cost or reallocate data to utilize the storage. Modeling module 116 can also model how known incidences are prevented and how it will impact the environment and overall production. Furthermore, by modeling improvements to individual SLIs for database servers and entities, modeling module 116 can provide guidance on what SLIs should be improved first and weighted the most important. The modeling module 116 can provide opportunities to focus efforts to improve of the overall hosted database environment, entities, and individual database servers. For example, modeling module 116 may determine how improvements to the archive backup score will improve the overall health of the environment while improvements SLIs for hang time and incident free time may provide the most improvement for a particular entity. Based on this information, action plans are created and implemented at the database server level, entity level, and environment level, as appropriate.

In some implementations, computing system(s) 102, environment(s) 104, and/or external resource(s) 120 may be operatively linked via one or more electronic communication links. For example, such electronic communication links may be established, at least in part, via a network, such as the Internet and/or other networks. It will be appreciated that this is not intended to be limiting, and the scope of this disclosure includes implementations in which computing system(s) 102, environment(s) 104, and/or external resource(s) 120 may be operatively linked via some other communication media.

A given environment 104 may include one or more processors configured to execute computer program modules. The computer program modules may be configured to enable an expert or user associated with the given environment 104 to interface with system 100 and/or external resource(s) 120, and/or provide other functionality attributed herein to environment(s) 104. By way of non-limiting example, a given environment 104 and/or a given computing platform 102 may include one or more of a server, a desktop computer, a laptop computer, a handheld computer, a tablet computing platform, a Netbook, a Smartphone, a gaming console, and/or other computing platforms.

External resources 120 may include sources of information outside of system 100, external entities participating with system 100, and/or other resources.

Computing system(s) 102 may include electronic storage 122, one or more processors 124, and/or other components. Computing system (s) 102 may include communication lines, or ports to enable the exchange of information with a network and/or other computing platforms. Illustration of computing system(s) 102 in FIG. 1 is not intended to be limiting. Computing system(s) 102 may include a plurality of hardware, software, and/or firmware components operating together to provide the functionality attributed herein to computing system(s) 102. For example, computing system(s) 102 may be implemented by a cloud of computing system operating together as computing system(s) 102.

Electronic storage 122 may comprise non-transitory storage media that electronically stores information. The electronic storage media of electronic storage 122 may include one or both of system storage that is provided integrally (i.e., substantially non-removable) with computing platform(s) 102 and/or removable storage that is removably connectable to computing system(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from computing system(s) 102, information received from hosted database environment(s) 104, and/or other information that enables computing system(s) 102 to function as described herein.

Processor(s) 124 may be configured to provide information processing capabilities in computing system(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device or processor(s) 124 may represent processing functionality of a plurality of devices operating in coordination. Processor(s) 124 may be configured to execute modules 108, 110, 112, 114, and/or 116, and/or other modules. Processor(s) 124 may be configured to execute modules 108, 110, 112, 114, and/or 116, and/or other modules by software; hardware; firmware; some combination of software, hardware, and/or firmware; and/or other mechanisms for configuring processing capabilities on processor(s) 124. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, and/or 116 are illustrated in FIG. 1 as being implemented within a single processing unit, in implementations in which processor(s) 124 includes multiple processing units, one or more of modules 108, 110, 112, 114, and/or 116 may be implemented remotely from the other modules. The description of the functionality provided by the different modules 108, 110, 112, 114, and/or 116 described below is for illustrative purposes, and is not intended to be limiting, as any of modules 108, 110, 112, 114, and/or 116 may provide more or less functionality than is described. For example, one or more of modules 108, 110, 112, 114, and/or 116 may be eliminated, and some or all of its functionality may be provided by other ones of modules 108, 110, 112, 114, and/or 116. As another example, processor(s) 124 may be configured to execute one or more additional modules that may perform some or all of the functionality attributed below to one of modules 108, 110, 112, 114, and/or 116.

Figure 3:
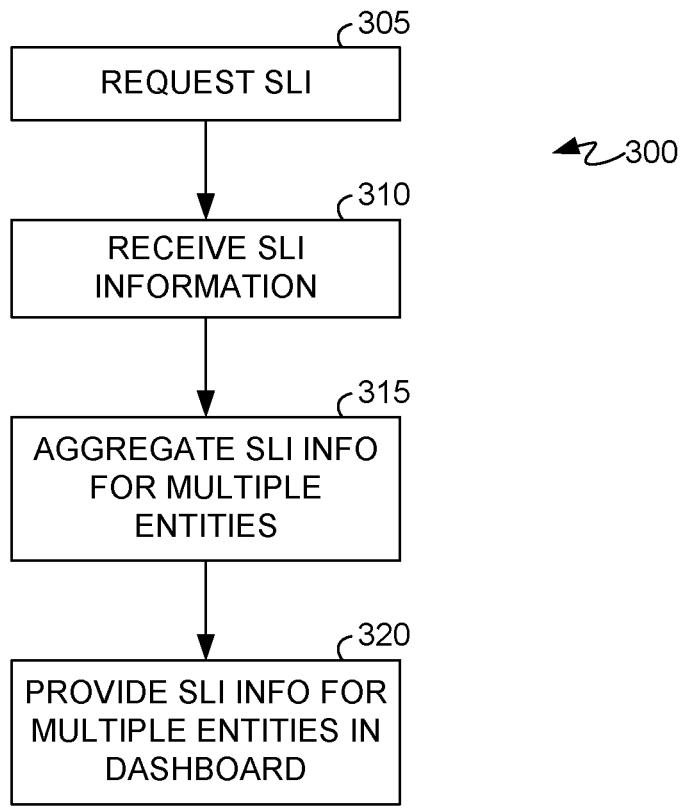
FIG. 3 depicts a flow chart for aggregating and providing service level indicator information for multiple entities, in accordance with aspects of the invention.
Figure 4:
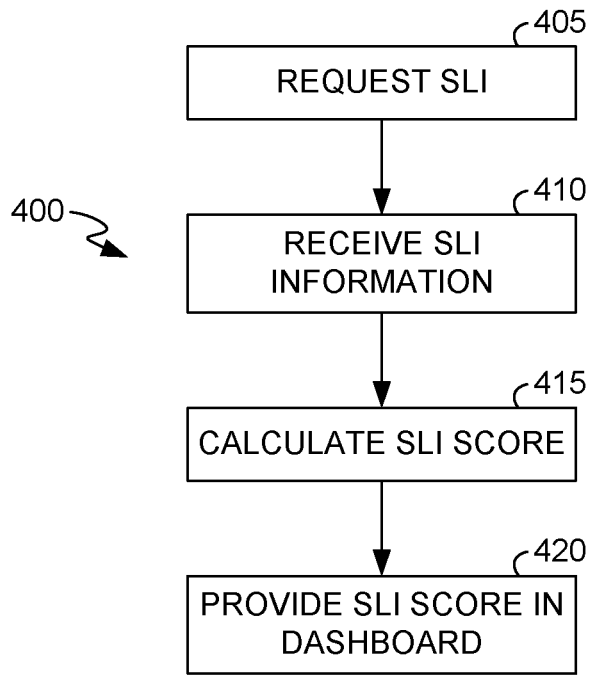
FIG. 4 depicts a flow chart for calculating scores for one or more service level indicators, in accordance with aspects of the invention.

FIGS. 3 and 4 illustrates a method useful in a computing system 102, in accordance with one or more implementations. With reference to FIGS. 3 and 4, operations of methods 300 and 400 presented below are intended to be illustrative. In some implementations, methods 300 and 400 may be accomplished with one or more additional operations not described, and/or without one or more of the operations discussed. Additionally, the order in which the operations of methods 300 and 400 are illustrated in FIGS. 3 and 4 described below is not necessarily limiting.

In some implementations, methods 300 and 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 300 and 400 in response to instructions stored electronically on an electronic storage medium. The one or more processing devices may include one or more devices configured through hardware, firmware, and/or software to be specifically designed for execution of one or more of the operations of methods 300 and 400.

FIG. 3 illustrates method 300, in accordance with one or more implementations. Method 300 may be performed by one or more hardware processors configured by machine-readable instructions, including a module that is the same as or similar to aggregating module 110 and dashboard module 114 in accordance with one or more implementations.

Operation 305 receives requests SLI information from database servers. Operation 310 receives the SLI information from the database servers for multiple entities. Operation 315 aggregates the SLI information by database server and entity. Operation 320 provides the SLI information for multiple entities in a database observation dashboard.

FIG. 4 illustrates method 400, in accordance with one or more implementations. Method 400 may be performed by one or more hardware processors configured by machine-readable instructions, including a module that is the same as or similar to scoring module 112 and dashboard module 114 in accordance with one or more implementations.

Operation 405 requests SLI information from database servers for multiple entities. Operation 410 receives the SLI information. Operation 415 calculates an SLI score for each SLI for each database server. Operation 420 provides the SLI scores for each database in database observation dashboard. Additionally, operation 420 can determine the aggregated SLI score for a database server and the average aggregated SLI score of all database servers for an entity. Operation 420 can calculate an aggregated SLI score for the environment by average the aggregated SLI scores of all entities.

Although the present technology has been described in detail for the purpose of illustration based on what is currently considered to be the most practical and preferred implementations, it is to be understood such detail is solely for that purpose and the technology is not limited to the disclosed implementations, but, on the contrary, is intended to cover modifications and equivalent arrangements that are within the spirit and scope of the appended claims. For example, it is to be understood the present technology contemplates that, to the extent possible, one or more features of any implementation can be combined with one or more features of any other implementation.

What is claimed is:

1. A computer-implemented method, comprising:
   causing, by at least one computer processor, multiple application programming interface (API) calls to request information for multiple service level indicators from database servers belonging to multiple different entities;
   receiving, the information for the multiple service level indicators from each of the database servers belonging to the multiple different entities;
   generating, utilizing the at least one computer processor, aggregated information in an electronic storage medium for each of the multiple different entities, the aggregated information comprising the information for the multiple service level indicators from each of the database servers for each of the multiple different entities; and providing, within a dashboard interface, the aggregated information for each of the multiple service level indicators for each of the database servers for each of the multiple different entities;

wherein the multiple service level indicators include multiple of database backups, uptime production improvements, downtime and rolling production improvements, database storage, block change tracking (BCT) score, assurance status monitoring (ASM) score, unused disk storage score, critical open incidents, incident free time (IFT), uptime, application hangs, average active sessions and non-critical open incidents; and wherein a configuration associated with at least one of the database servers is modified based on the aggregated information.

2. The method of claim 1, further comprising:

receiving, via the dashboard interface provided at a user device, a particular entity; and providing, within the dashboard interface, the aggregated information for each of the multiple service level indicators for each of the database servers for the particular entity.

3. The method of claim 1, further comprising:

determining, utilizing the at least one computer processor, a service level indicator score for each of the multiple service level indicators for a database server.

4. The method of claim 3, further comprising:

determining, utilizing the at least one computer processor, a first aggregated service level indicator score for the database server by applying a weighted formula to the service level indicator score for each of the multiple service level indicators; and providing, within the dashboard interface, the first aggregated service level indicator score for the database server.

5. The method of claim 4, further comprising:

determining, utilizing the at least one computer processor, a second aggregated service level indicator score for an entity by averaging the first aggregated service level indicator score for each of the database servers of the entity; and providing, within the dashboard interface, the second aggregated service level indicator score for the entity.

6. The method of claim 1, wherein each of the multiple different entities are physically and digitally separate from one another.

7. A system for aggregating service level indicators, the system comprising:

a computing device having one or more processors and one or more computer-storage media; and a data store in communication with the computing device, wherein the computing device:

receives information for multiple service level indicators from database servers belonging to multiple different entities;

generates aggregated information in the one or more computer-storage media for each of the multiple different entities, the aggregated information comprising the information for the multiple service level indicators from each of the database servers for each of the multiple different entities; and provides, within a dashboard interface, the aggregated information for each of the multiple service level indicators for each of the database servers for each of the multiple different entities;

wherein the multiple service level indicators include multiple of database backups, uptime production improvements, downtime and rolling production improvements, database storage, block change tracking (BCT) score, assurance status monitoring (ASM) score, unused disk storage score, critical open incidents, incident free time (IFT), uptime, application hangs, average active sessions and non-critical open incidents; and wherein a configuration associated with at least one of the database servers is modified based on the aggregated information.

8. The system of claim 7, wherein the system:

receives, via the dashboard interface provided at a user device, a particular entity; and provides, within the dashboard interface, the aggregated information for each of the multiple service level indicators for each of the database servers for the particular entity.

9. The system of claim 7, wherein the system:

determines a service level indicator score for each of the multiple service level indicators for a database server.

10. The system of claim 9, wherein the system:

determines a first aggregated service level indicator score for the database server by applying a weighted formula to the service level indicator score for each of the multiple service level indicators; and provides, within the dashboard interface, the first aggregated service level indicator score for the database server.

11. The system of claim 10, wherein the system:

determines, utilizing the one or more processors, a second aggregated service level indicator score for an entity by averaging the first aggregated service level indicator score for each of the database servers of the entity; and provides, within the dashboard interface, the second aggregated service level indicator score for the entity.

12. One or more non-transitory computer-storage media having computer executable instructions embodied thereon that when executed by a computer perform a method of aggregating service level indicators, the method comprising:

causing, by at least one computer processor, multiple application programming interface (API) calls to request information for multiple service level indicators from database servers belonging to multiple different entities;

receiving, the information for the multiple service level indicators from each of the database servers belonging to the multiple different entities;

generating, utilizing the at least one computer processor, aggregated information in an electronic storage medium for each of the multiple different entities, the aggregated information comprising the information for the multiple service level indicators from each of the database servers for each of the multiple different entities; and providing, within a dashboard interface, the aggregated information for each of the multiple service level indicators for each of the database servers for each of the multiple different entities;

wherein the multiple service level indicators include multiple of database backups, uptime production improvements, downtime and rolling production improvements, database storage, block change tracking (BCT) score, assurance status monitoring (ASM) score, unused disk storage score, critical open incidents, incident free time (IFT), uptime, application hangs, average active sessions and non-critical open incidents; and wherein a configuration associated with at least one of the database servers is modified based on the aggregated information.

13. The media of claim 12, further comprising:
receiving, via the dashboard interface provided at a user device, a particular entity; and
providing, within the dashboard interface, the aggregated information for each of the multiple service level indicators for each of the database servers for the particular entity.

14. The media of claim 12, further comprising:
determining, utilizing the at least one computer processor, a service level indicator score for each of the multiple service level indicators for a database server.

15. The media of claim 14, further comprising:
determining, utilizing the at least one computer processor, a first aggregated service level indicator score for the database server by applying a weighted formula to the service level indicator score for each of the multiple service level indicators; and
providing, within the dashboard interface, the first aggregated service level indicator score for the database server.

16. The media of claim 15, further comprising:
determining, utilizing the at least one computer processor, a second aggregated service level indicator score for an entity by averaging the first aggregated service level indicator score for each of the database servers of the entity; and
providing, within the dashboard interface, the second aggregated service level indicator score for the entity.

17. The media of claim 12, wherein each of the multiple different entities are physically and digitally separate from one another.

* * * * *